(12) United States Patent
Imai (10) Patent No.: US 10,904,502 B2
(45) Date of Patent: Jan. 26, 2021

(54) PROJECTOR AND METHOD FOR CONTROLLING PROJECTOR

(71) Applicant: SEIKO EPSON CORPORATION, Tokyo (JP)

(72) Inventor: Shun Imai, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/551,850

(22) Filed: Aug. 27, 2019

(65) Prior Publication Data

US 2020/0077064 A1 Mar. 5, 2020

(30) Foreign Application Priority Data

Aug. 28, 2018 (JP) ................................. 2018-159273

(51) Int. Cl.
*H04N 9/31* (2006.01)

(52) U.S. Cl.
CPC ......... *H04N 9/3194* (2013.01); *H04N 9/3179* (2013.01)

(58) Field of Classification Search
CPC .................................................. H04N 21/4316
See application file for complete search history.

(56) References Cited

U.S. PATENT DOCUMENTS

| 2005/0200868 | A1* | 9/2005 | Yoshida | H04N 1/6027 358/1.9 |
| 2009/0222761 | A1* | 9/2009 | Hayashi | G06F 3/14 715/781 |
| 2014/0028918 | A1* | 1/2014 | Kim | H04H 60/45 348/564 |
| 2014/0118294 | A1* | 5/2014 | Yamada | G06F 3/0487 345/174 |
| 2014/0306919 | A1 | 10/2014 | Tanaka et al. | |
| 2016/0249008 | A1* | 8/2016 | Kitazawa | G06F 19/3481 |
| 2017/0011555 | A1* | 1/2017 | Li | G06T 1/60 |
| 2018/0183994 | A1* | 6/2018 | Yoshida | G03B 5/00 |
| 2018/0316888 | A1* | 11/2018 | Fujimori | G09G 5/00 |
| 2019/0235371 | A1* | 8/2019 | Imai | G09G 5/00 |
| 2019/0342727 | A1* | 11/2019 | Park | G10L 15/1822 |

FOREIGN PATENT DOCUMENTS

| JP | 2006-267678 A | 10/2006 |
| JP | 2013-33499 A | 2/2013 |
| JP | 2013-125508 A | 6/2013 |
| JP | 2015-158619 A | 9/2015 |

* cited by examiner

Primary Examiner — Paulos M Natnael
(74) Attorney, Agent, or Firm — Oliff PLC (57) ABSTRACT

A projector includes a projection section that projects a first setting screen for setting the projector on a projection surface, a display section that is disposed at an enclosure of the projector and displays a second setting screen for setting the projector, a determiner that determines the usage of the projector, and a mode switcher that switches the action mode of the projector between a first mode in which the projection section projects the first setting screen and a second mode in which the display section displays the second setting screen in accordance with the usage determined by the determiner.

7 Claims, 7 Drawing Sheets

PROJECTOR AND METHOD FOR CONTROLLING PROJECTOR

The present application is based on, and claims priority from JP Application Serial Number 2018-159273, filed Aug. 28, 2018, the disclosure of which is hereby incorporated by reference herein in its entirety.

BACKGROUND

1. Technical Field

The present disclosure relates to a projector and a method for controlling the projector.

2. Related Art

There is a disclosed projector including a display section (monitor) provided on the rear surface or the side surface of the main body (enclosure), as described, for example, in JP-A-2015-158619. A user can use the display section to adjust and set the projector.

In a case where a setting screen is displayed in the display section described above for a variety of settings, the screen of the display section is so small that the amount of displayed information is small, resulting in a decrease in user's convenience. Further, the user may be annoyed by light leakage from the display section, or the user's hand may come into contact with the display section so that the projector malfunctions or the hand blocks the line of sight of a person who views a projected image, depending on the environment in which the projector is used.

On the other hand, when the projector displays the setting screen in the form of an on-screen display (OSD) image, the large size of the setting screen improves the user's convenience. However, for example, when no screen on which an image is projected is installed or when a projection surface screen has irregularities, the visibility of the setting screen decreases, resulting in a difficulty in setting and other problems.

SUMMARY

A projector according to an aspect of the present application includes a projection section that projects a first setting screen for setting the projector on a projection surface, a display section that is disposed at an enclosure of the projector and displays a second setting screen for setting the projector, a determiner that determines usage of the projector, and a mode switcher that switches an action mode of the projector between a first mode in which the projection section projects the first setting screen and a second mode in which the display section displays the second setting screen in accordance with the usage determined by the determiner.

The projector described above may further include a cover that blocks the projection performed by the projection section. The determiner may determine whether the cover is open or closed, and the mode switcher my switch the action mode to the first mode when the cover is open and switch the action mode to the second mode when the cover is closed.

The projector described above may include an imaging section that captures an image of the projection surface. The determiner may determine whether or not a state of the projection surface allows visual recognition of the first setting screen based on the image captured by the imaging section. The mode switcher may switch the action mode to the first mode when the determiner determines that the state of the projection surface allows visual recognition of the first setting screen and switch the action mode to the second mode when the determiner determines that the state of the projection surface does not allow visual recognition of the first setting screen.

In the projector described above, the projection section may include a light source. The determiner may determine whether or not the light source is turned on. The switcher may switch the action mode to the first mode when the light source is turned on and switch the action mode to the second mode when the light source is turned off.

In the projector described above, the projection section may include an interchangeable projection system, and the determiner may determine whether or not the projection system is attached. The switcher may switch the action mode to the first mode when the projection system is attached and switch the action mode to the second mode when the projection system is not attached.

A projector controlling method according to another aspect of the present application is a method for controlling a projector including a projection section and a display section disposed at an enclosure of the projector, the method including determining usage of the projector and switching a first mode in which the projection section projects a first setting screen for setting the projector on a projection surface to a second mode in which the display section displays a second setting screen for setting the projector and vice versa in accordance with the determined usage.

In the projector controlling method described above, a cover that blocks projection may be disposed in the projector, and whether the cover is open or closed may be determined. An action mode of the projector may be switched to the first mode when the cover is open, and the action mode may be switched to the second mode when the cover is closed.

The method for controlling a projector described above may further include capturing an image of the projection surface, determining whether or not a state of the projection surface allows visual recognition of the first setting screen, switching an action mode of the projector to the first mode when it is determined that the state of the projection surface allows visual recognition of the first setting screen, and switching the action mode to the second mode when it is determined that the state of the projection surface does not allow visual recognition of the first setting screen.

DESCRIPTION OF EXEMPLARY EMBODIMENTS

A projector according to an embodiment of the present disclosure will be described below with reference to the drawings.

First Embodiment

Figure 1:
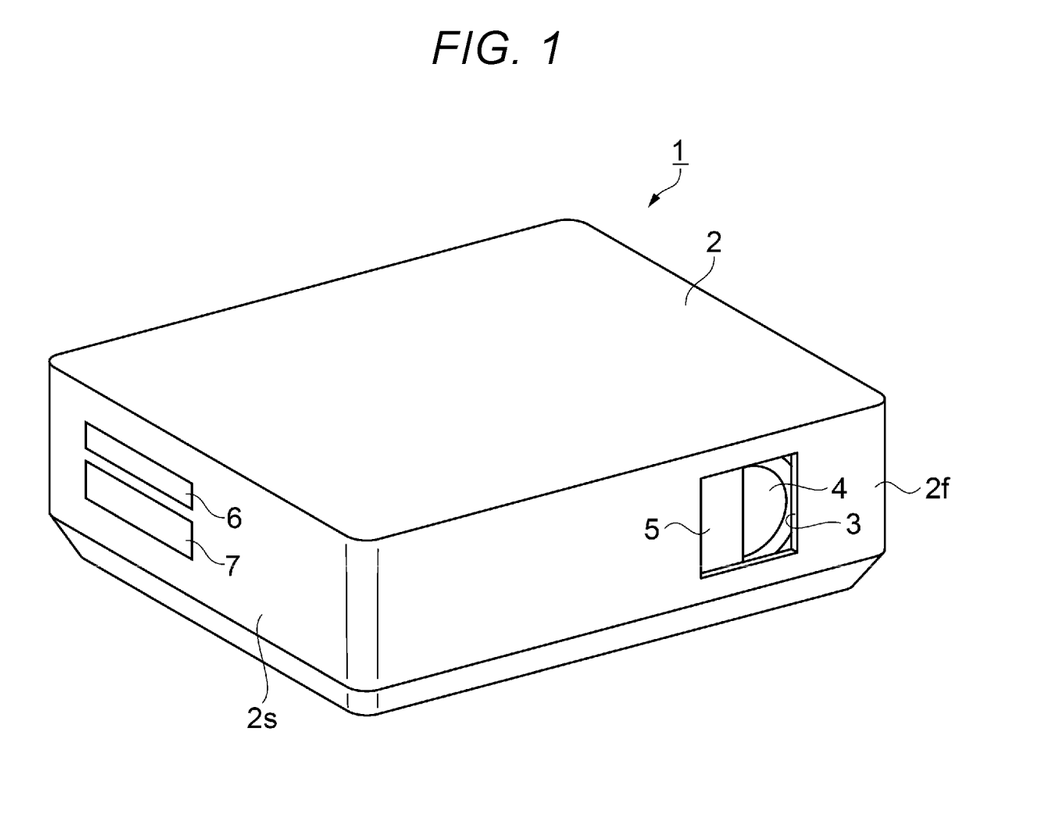
FIG. 1 is a perspective view showing the configuration of a projector according to a first embodiment.

FIG. 1 is a perspective view showing the configuration of the projector according to the present embodiment. The configuration of the projector will be described below with reference to FIG. 1.

A projector 1 has a configuration in which a main body is covered with an enclosure 2, as shown in FIG. 1. An opening 3 is provided in a front surface 2f of the enclosure 2. A projection lens 4, which projects image light forward, is provided behind the opening 3. A lens cover 5 (shutter) is provided as a cover in the opening 3 in an openable/closable manner.

Closing the opening 3 with the lens cover 5 allows protection of the projection lens 4. The lens cover 5 is formed, for example, of a plate-shaped element made of a synthetic resin. A display section 6, which displays a variety of setting contents, and an operation panel 7, on which a user's input operation is performed, are provided on a side surface 2s of the enclosure 2.

Figure 2:
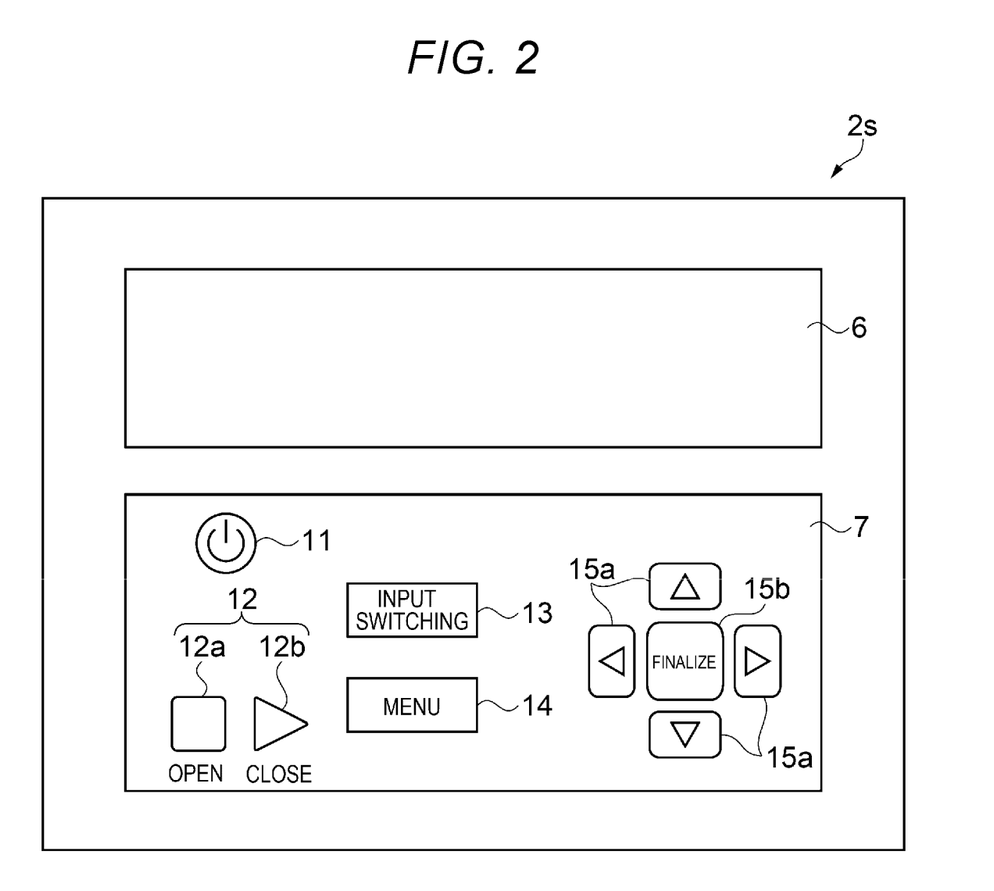
FIG. 2 is an enlarged side view showing the configuration of enlarged part of a side surface of an enclosure.

FIG. 2 is an enlarged side view showing enlarged part of the side surface of the enclosure. The configuration of part of the side surface of the enclosure will be described with reference to FIG. 2.

The display section 6 and the operation panel 7 are provided on the side surface 2s of the enclosure 2, as shown in FIG. 2. The display section 6 is formed, for example, of a liquid crystal display. The display section 6 displays a menu screen for a variety of settings of the projector 1, environmental states of the projector 1 (temperature in main body, for example), and other pieces of information.

The operation panel 7 includes a plurality of operation keys that allow the user to make a variety of settings of the projector 1. Examples of the operation keys include a power key 11, which switches a power-on state to a power-off (standby) state and vice versa, a close key 12a, which is one of open/close keys 12 and closes the lens cover 5, and an open key 12b, which is the other one of the open/close keys 12 and opens the lens cover 5, and the power key 11 and the open/close keys 12 are disposed in a left portion of the operation panel 7.

Other examples of the operations keys include an input switching key 13, which switches inputted image information to another, and a menu key 14, which displays the menu screen for the variety of settings, and the input switching key 13 and the menu key 14 are disposed in a central portion of the operation panel 7.

Still other examples of the operations keys include cursor keys 15a, which move and otherwise change a cursor in the menu screen, and a finalizing key 15b, which finalizes the variety of settings, and the cursor keys 15a and the finalizing key 15b are disposed in a right portion of the operation panel 7.

Figure 3:
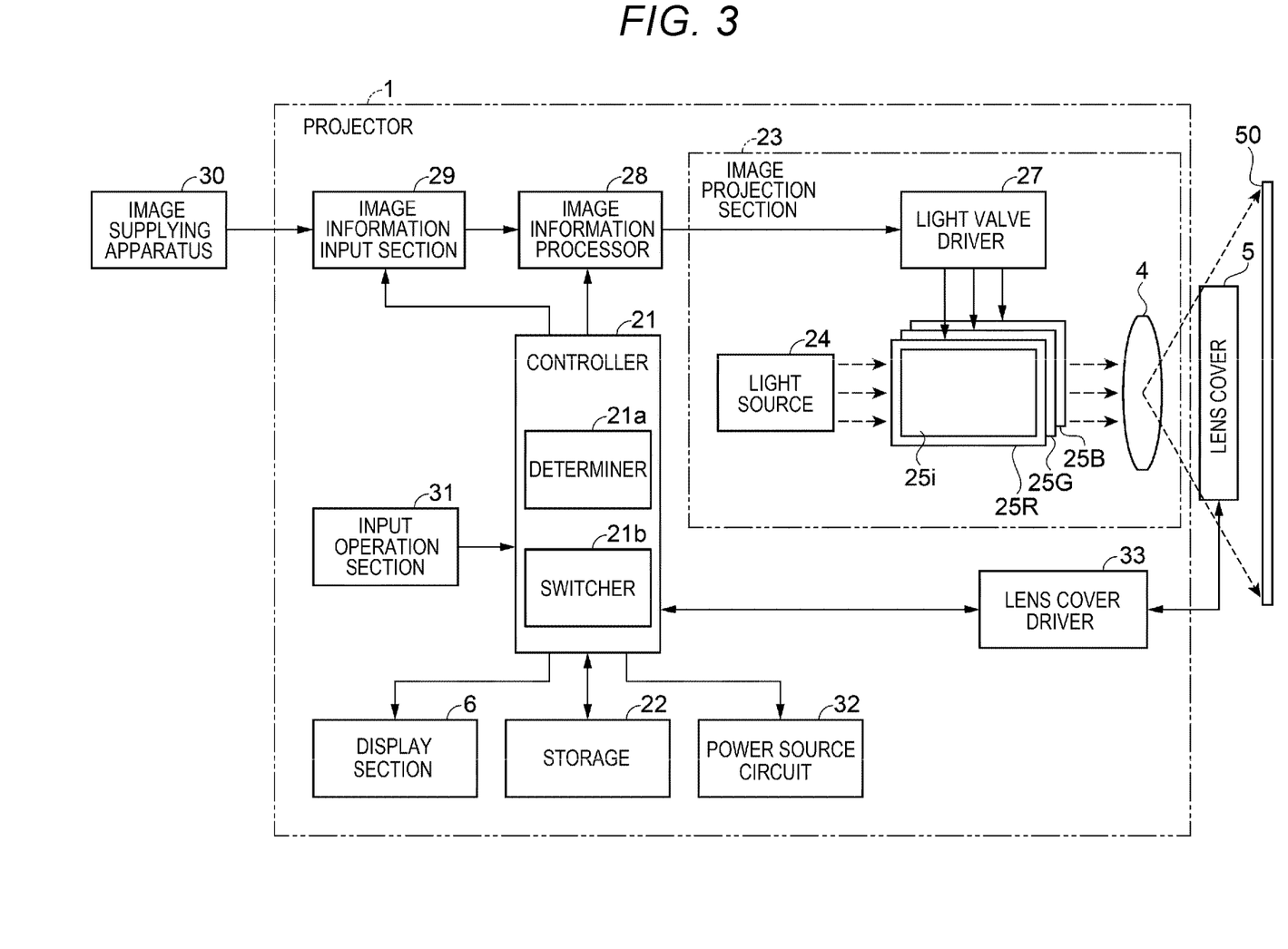
FIG. 3 is a block diagram showing the configuration of the projector.

FIG. 3 is a block diagram showing the configuration of the projector. The block diagram showing the configuration of the projector will be described with reference to FIG. 3.

The projector 1 includes a controller 21, a storage 22, an image projection section 23 as a projection section, an image information processor 28, an image information input section 29, an input operation section 31, the display section 6, and a lens cover driver 33, as shown in FIG. 3.

The controller 21 includes one or more processors and acts in accordance with a control program (not shown) stored in the storage 22 to oversee and control the action of the projector 1.

The storage 22 includes a memory, such as a RAM (random access memory) and a ROM (read only memory). The RAM is used to temporarily store a variety of data and other pieces of information. The ROM stores the control program, a variety pieces of setting information, and other pieces of information for controlling the action of the projector 1.

The image projection section 23 includes a light source 24, three liquid crystal light valves 25R, 25G, and 25B, the projection lens 4 as a projection system, and a light valve driver 27. In the image projection section 23, the liquid crystal light valves 25R, 25G, and 25B modulate light outputted from the light source 24 to form image light and the projection lens 4 projects the image light to display an image on a projection surface 50.

The light source 24 includes a discharge-type light source lamp, such as an ultrahigh-pressure mercury lamp and a metal halide lamp, or a solid-state light source, such as a light emitting diode and a semiconductor laser. The light outputted from the light source 24 is converted by an optical integration system that is not shown into light having a substantially uniform luminance distribution and separated by a color separation system that is not shown into color light components of red (R), green (G), and blue (B), which are the three primary colors of light, and the RGB color light components are then incident on the liquid crystal light valves 25R, 25G, and 25B, respectively.

The liquid crystal light valves 25R, 25G, and 25B are each formed, for example, of a transmissive liquid crystal panel in which a pair of transparent substrates encapsulate a liquid crystal material. The liquid crystal panels each have a rectangular pixel area 25i, which is formed of a plurality of pixels arranged in a matrix, and drive voltage is applicable to the liquid crystal material on a pixel basis.

The light valve driver 27 forms an image in the pixel area 25i of each of the liquid crystal light valves 25R, 25G, and 25B. Specifically, the light valve driver 27 applies drive voltage according to image information inputted from the image information processor 28 to each of the pixels in the pixel areas 25i to cause the pixel to have light transmittance according to the image information.

The light outputted from the light source 24 passes through the pixel area 25i of each of the liquid crystal light valves 25R, 25G, and 25B, which modulate the light on a pixel basis, so that image light according to the image information is formed on a color light basis. The thus formed R image light, G image light, and B image light are combined with one another on a pixel basis by a light combining system that is not shown into image light representing a color image, which is enlarged and projected by the projection lens 4 on the projection surface 50. As a result, an image based on the image information inputted to the image information input section 29 is displayed on the projection surface 50.

The image information input section 29 is coupled to an external image supplying apparatus 30, such as an image reproducing apparatus, and receives image information corresponding to a content image supplied from the image supplying apparatus 30. The image information input section 29 can instead receive from the controller 21 image information stored in the storage 22 and image information produced by the controller 21. The image information input section 29 outputs the inputted image information to the image information processor 28.

The image information processor 28 performs a variety of types of image processing on the image information inputted from the image information input section 29 and outputs the processed image information to the light valve driver 27 in the image projection section 23 under the control of the controller 21. The image information processor 28 processes the image information as required. For example, the image information processor 28 adjusts the image quality, corrects the shape of an image (distortion), superimposes an on-screen display (OSD) image, such as a menu screen and a message screen, on a content image, and otherwise processes the image information.

The input operation section 31 includes the operation panel 7 described above. When the user operates any of the variety of operation keys on the operation panel 7, the input operation section 31 receives the operation and outputs an operation signal according to the content of the operation to the controller 21. A remote control (not shown) that allows the user to remotely operate the projector 1 may be used as the input operation section 31. In this case, the remote control issues an infrared operation signal according to the content of the user's operation, and a remote control signal receiver that is not shown receives the infrared operation signal and transmits the signal to the controller 21.

Commercial power (not shown), such as AC 100 V, is externally supplied to a power source circuit 32. When the power key 11 described above is pressed, the power source circuit 32 converts the commercial power (AC power) into DC power in the form of predetermined voltage and supplies each portion of the projector 1 with the electric power (Path along which electric power is supplied to each portion is not shown). The controller 21 can control the power source circuit 32 to start and stop supplying the power to each section of the projector 1.

Specifically, the controller 21 can switch an on-state in which electric power necessary for normal action of the projector 1 is supplied from the power source circuit 32 to each portion of the projector 1 (also called "power-on state") to an off-state in which the supply of the power to each portion of the projector 1 is so restricted that power consumption is extremely lower than in the on-state (also called "power-off state" or "standby state") and vice versa.

The display section 6 is provided on the side surface 2s of the enclosure 2 of the projector 1, as described above. The display section 6 is formed, for example, of a liquid crystal display that is so sized as to be capable of displaying about three letter strings in the present embodiment.

The lens cover driver 33 is formed, for example, of a motor and opens and closes the lens cover 5 under the control of the controller 21. Specifically, when the user presses the open key 12b on the operation panel 7, the controller 21 instructs the lens cover driver 33 to open the lens cover 5. On the other hand, when the user presses the close key 12a on the operation panel 7, the controller 21 instructs the lens cover driver 33 to close the lens cover 5. The user opens the lens cover 5 when the user causes the projector 1 to project an image and closes the lens cover 5 when the user causes the projector 1 to project no image to protect the projection lens 4. The controller 21 includes, as functional blocks achieved by the control program, a determiner 21a and a switcher 21b as a mode switcher.

The determiner 21a determines whether or not the lens cover 5 is open or closed. The storage 22 stores open/close information representing whether the lens cover 5 is currently open or closed, and the controller 21 updates the open/close information when the controller 21 causes the lens cover driver 33 to open or close the lens cover 5. The determiner 21a can therefore determine whether the lens cover 5 is open or closed by referring to the open/close information. The projector 1 according to the present embodiment acts differently in accordance with whether the lens cover 5 is open or closed when the user makes the variety of settings of the projector 1.

The switcher 21b switches the action mode of the projector 1 between a first mode and a second mode in accordance with the projector usage state determined by the determiner 21a. The first and second modes will be described later.

Figure 4:
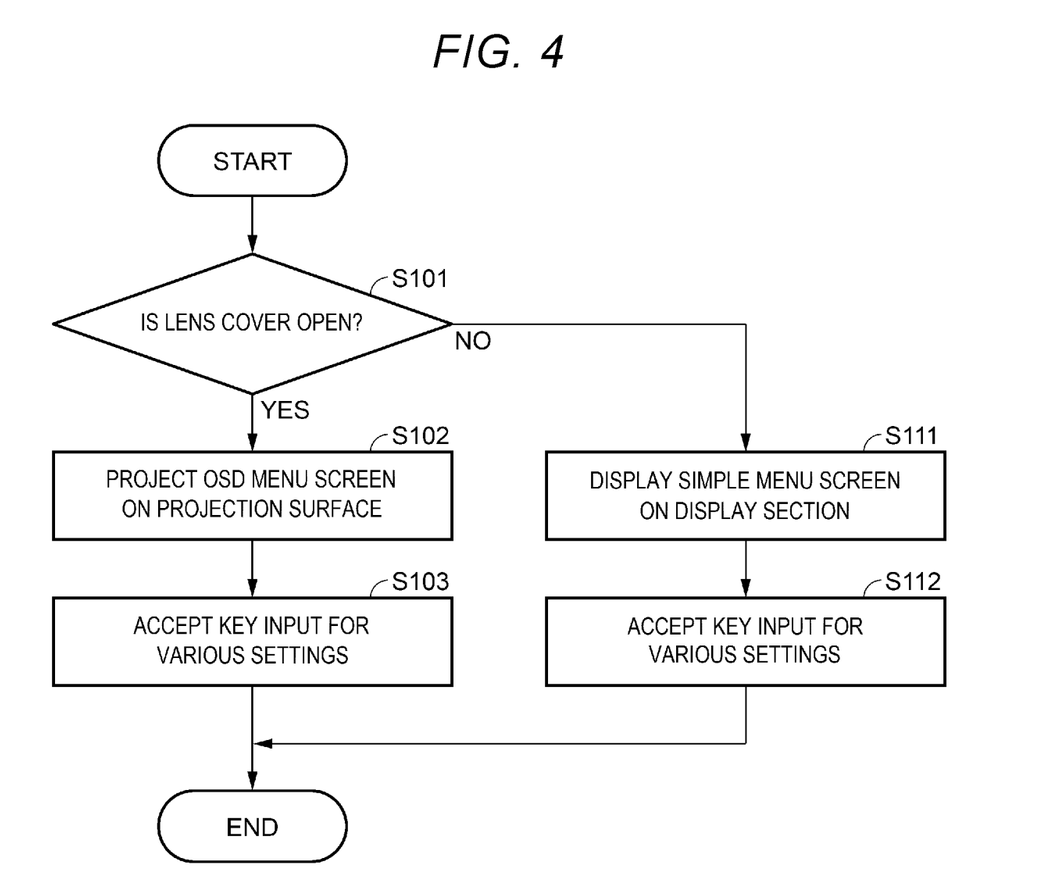
FIG. 4 is a flowchart showing the action of the projector.
Figure 5:
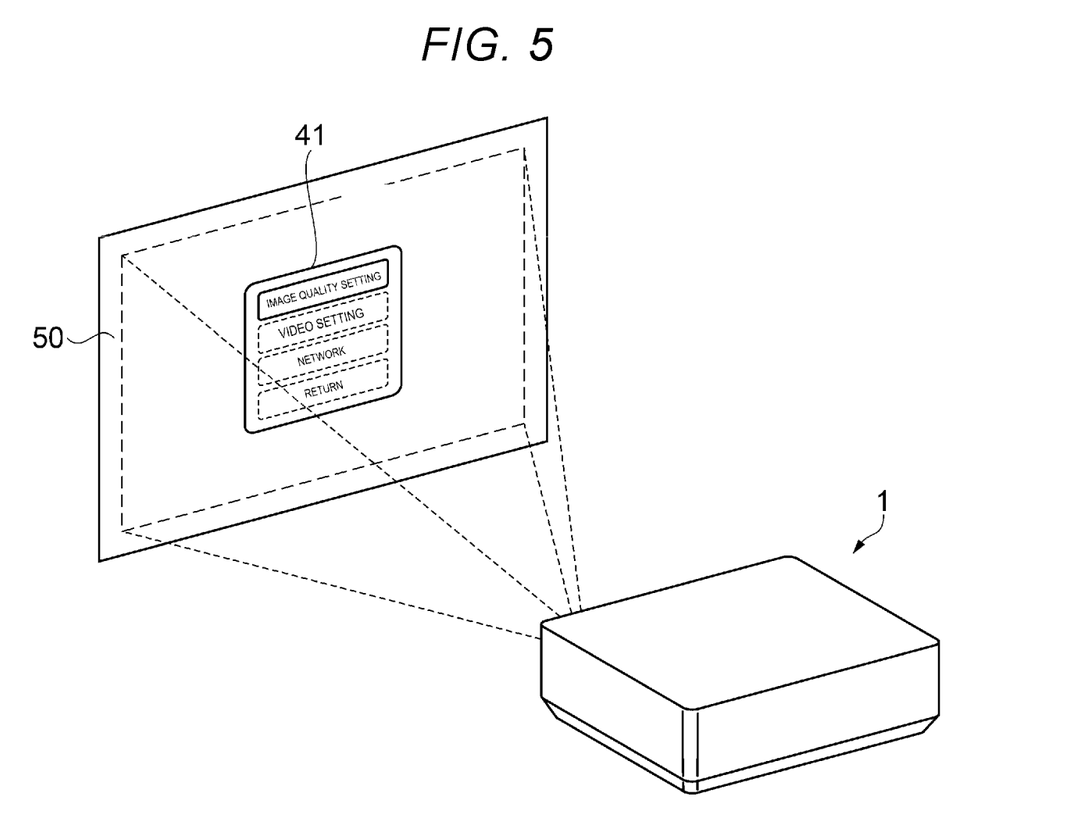
FIG. 5 is a diagrammatic view showing an OSD menu image projected on a projection surface.
Figure 6:
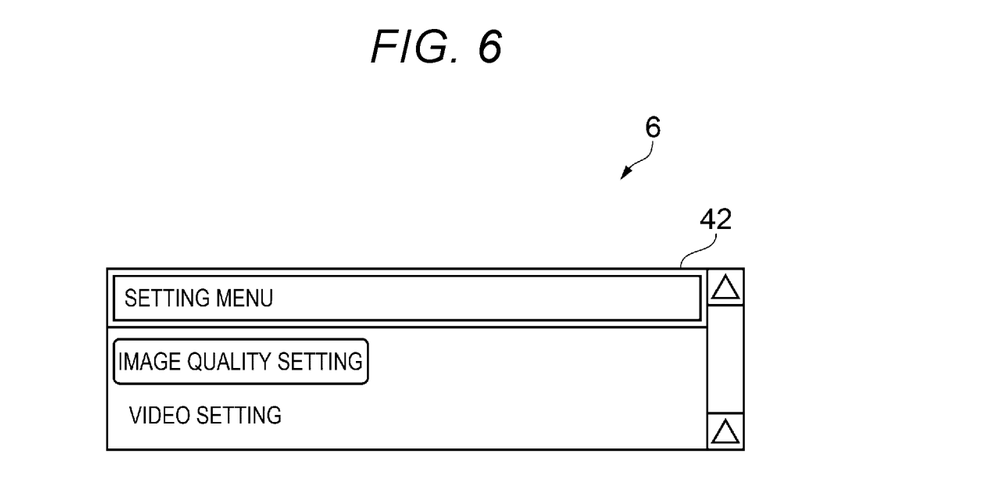
FIG. 6 is a diagrammatic view showing a simple menu screen that is a second setting screen displayed on a display section.

FIG. 4 is a flowchart showing the action performed by the projector when the variety of settings are made. FIG. 5 is a diagrammatic view showing an OSD menu screen that is projected on a projection surface and is a first setting screen. FIG. 6 is a diagrammatic view showing a simple menu screen that is displayed in the display section and is a second setting screen. The action of the projector 1 (method for controlling projector 1) will be described below with reference to FIGS. 4 to 6. When the user operates the menu key 14 on the operation panel 7, the projector 1 acts in accordance with the procedure shown in FIG. 4.

In step S101, the controller 21 causes the determiner 21a to determine whether or not the lens cover 5 is open, as shown in FIG. 4. In a case where the determiner 21a determines that the lens cover 5 is open (open state), the controller 21 proceeds to the process in step S102. In a case where the determiner 21a determines that the lens cover 5 is closed (closed state), the controller 21 proceeds to the process in step S111.

In the case where the determiner 21a determines that the lens cover 5 is open and the controller 21 proceeds to the process in step S102, the controller 21 causes the image projection section 23 to project an OSD menu screen 41 on the projection surface 50, as shown in FIG. 5. Specifically, the controller 21 reads image information on the OSD menu screen 41 from the storage 22. Further, the controller 21 outputs the read image information to the image information processor and instructs the image information processor 28 to superimpose the OSD menu screen 41 on the projected image and project the resultant image.

The OSD menu screen 41 is a menu screen as the first setting screen for the variety of settings of the projector 1. Items settable in the OSD menu screen 41 include "image quality setting" for adjusting the color and brightness of an image to be projected, "video setting" for setting the resolution, the aspect ratio, and other factors of an image (video), and other settings. In a case where the projector 1 is connected to a network, the OSD menu screen 41 may allow the user to set information on the network and adjust the focusing state, the zooming state, the lens shift state, and other states of the projection lens 4.

In step S103, a key input from the operation panel 7 is accepted for the variety of settings of the projector 1. Specifically, when the user operates any of the keys on the operation panel 7 while viewing the projected OSD menu screen 41, the operation panel 7 outputs an operation signal according to the content of the user's operation to the controller 21, as shown in FIG. 5. The controller 21 carries out a setting process according to the operation signal and terminates the procedure. The setting process is, for example, the process of storing information set by the user in the storage 22.

In the case where the determiner 21a determines that the lens cover 5 is closed and the controller 21 proceeds to the process in step S111, the controller 21 displays a simple menu screen 42 on the display section 6 on the side surface 2s of the projector 1, as shown in FIG. 6. Specifically, the controller 21 reads image information on the simple menu screen 42 from storage 22. Further, the controller 21 outputs the read image information to the display section 6 and instructs the display section 6 to display the simple menu screen 42.

The simple menu screen 42 is a menu screen as the second setting screen for the variety of settings of the projector 1, and items settable in the simple menu screen 42 include the "image quality setting," "video setting," and other settings and further include setting of the network, setting of the projection lens 4, and other settings as required, as in the case of the OSD menu screen 41.

In step S112, a key input from the operation panel 7 is accepted for the variety of settings of the projector 1. Specifically, when the user operates any of the keys on the operation panel 7 while viewing the simple menu screen 42 displayed on the display section 6, the operation panel 7 outputs an operation signal according to the content of the user's operation to the controller 21. The controller 21 carries out a setting process according to the operation signal and terminates the procedure.

The first mode includes the action of projecting the OSD menu screen 41 on the projection surface 50 with no simple menu screen 42 displayed on the display section 6 and prompting the user to operate the operation panel 7 in accordance with the displayed OSD menu screen 41. The second mode includes the action of displaying the simple menu screen 42 on the display section 6 with no OSD menu screen 41 displayed on the projection surface 50, and prompting the user to operate the operation panel 7 in accordance with the simple menu screen 42 displayed on the display section 6.

As described above, the projector 1 and the method for controlling the projector 1 according to the first embodiment can provide the following effects.

(1) According to the first embodiment, the projector 1 projects the OSD menu screen 41 on the projection surface 50 when the lens cover 5 is open and displays the simple menu screen 42 on the display section 6 when the lens cover 5 is closed. That is, when the lens cover 5 is open to allow image projection, the OSD menu screen 41 is displayed on the projection surface 50, whereby the user can set the projector 1 via a large screen. On the other hand, when the lens cover 5 is closed to allow no image projection, the simple menu screen 42 is displayed on the display section 6, whereby the user can set the projector 1 with no image projected from the projector 1. Since the projector 1 displays one of the menu screens in an appropriate aspect in accordance with whether the lens cover 5 is open or closed, as described above, the convenience of the user who sets the projector 1 can be improved.

(2) According to the first embodiment, in which the setting screen projected on the projection surface 50 is an OSD image, the setting screen can be superimposed on another projected image, whereby the variety of setting of the projector 1 can be smoothly made.

Second Embodiment

Figure 7:
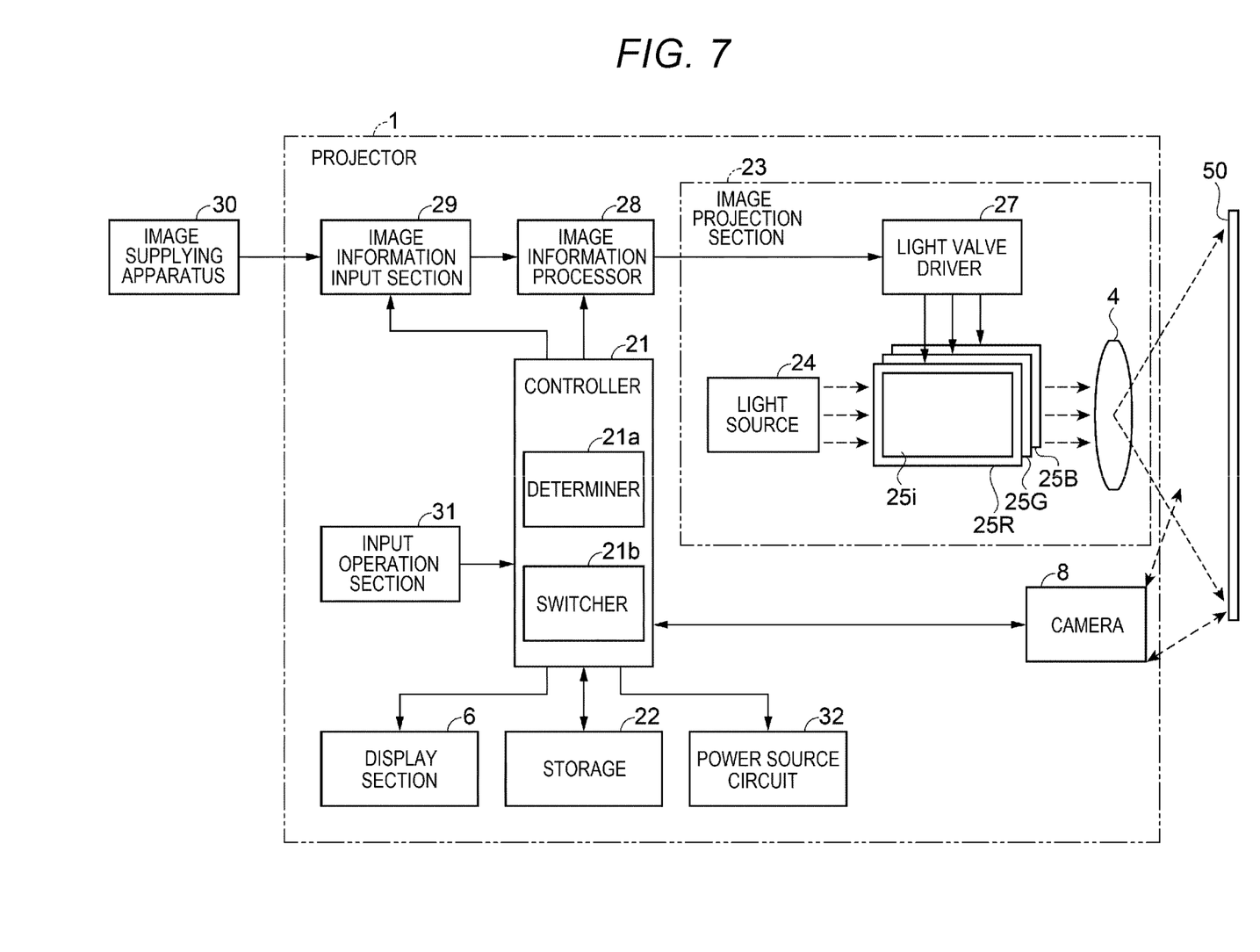
FIG. 7 is a block diagram showing the configuration of a projector according to a second embodiment.

FIG. 7 is a block diagram showing the configuration of a projector according to a second embodiment. The configuration of the projector according to the second embodiment will be described below with reference to FIG. 7.

The projector 1 according to the first embodiment changes the menu screen display aspect in accordance with whether the lens cover 5 is open or closed, whereas the projector 1 according to the second embodiment changes the menu screen display aspect in accordance with the state of the projection surface 50. The other portions of the projector 1 according to the second embodiment are substantially the same as those in the first embodiment. Therefore, in the second embodiment, portions different from those in the first embodiment will be described in detail, and the other duplicate portions are not described as appropriate.

The projector 1 includes the controller 21, the storage 22, the image projection section 23, the image information processor 28, the image information input section 29, the input operation section 31, the display section 6, and an imaging section 8, as shown in FIG. 7. The projector 1 according to the second embodiment differs from the projector 1 according to the first embodiment in that the imaging section 8 is provided in addition to the configuration in the first embodiment.

The imaging section 8 is a camera including a CCD (charge coupled device) sensor, a CMOS (complementary metal oxide semiconductor) sensor, or any other imaging device (not shown). The imaging section 8 is so disposed as to be capable of perform imaging along the direction toward the projection surface 50, that is, the direction in which the image projection section 23 projects an image. The imaging section 8 captures an image of the OSD menu screen 41 projected on the projection surface 50 in response to an instruction from the controller 21.

The determiner 21a in the present embodiment determines, based on an image of the OSD menu screen 41 captured by the imaging section 8, whether or not the user can appropriately visually recognize the OSD menu screen 41. For example, when a screen that should be installed as the projection surface 50 in the first place is not installed, or when a content image is projected on a projection surface 50 originally having irregularities, the projected OSD menu screen 41 is visually recognized as a distorted or bent screen. It is also difficult to visually recognize the OSD menu screen 41 projected on a dark-color surface. Any of the cases described above causes a problem of a difficulty for the user in setting the projector 1.

The determiner 21a performs contour extraction on the image captured by the imaging section 8 to detect the contour of the OSD menu screen 41. In a case where no contour is detected, or when the detected contour is distorted or discontinuous, the determiner 21a determines that the projection surface 50 has a state that does not allow appropriate visual recognition of the OSD menu screen 41. The projector 1 according to the present embodiment acts differently in accordance with the state of the projection surface 50 when the user makes the variety of settings of the projector 1.

Figure 8:
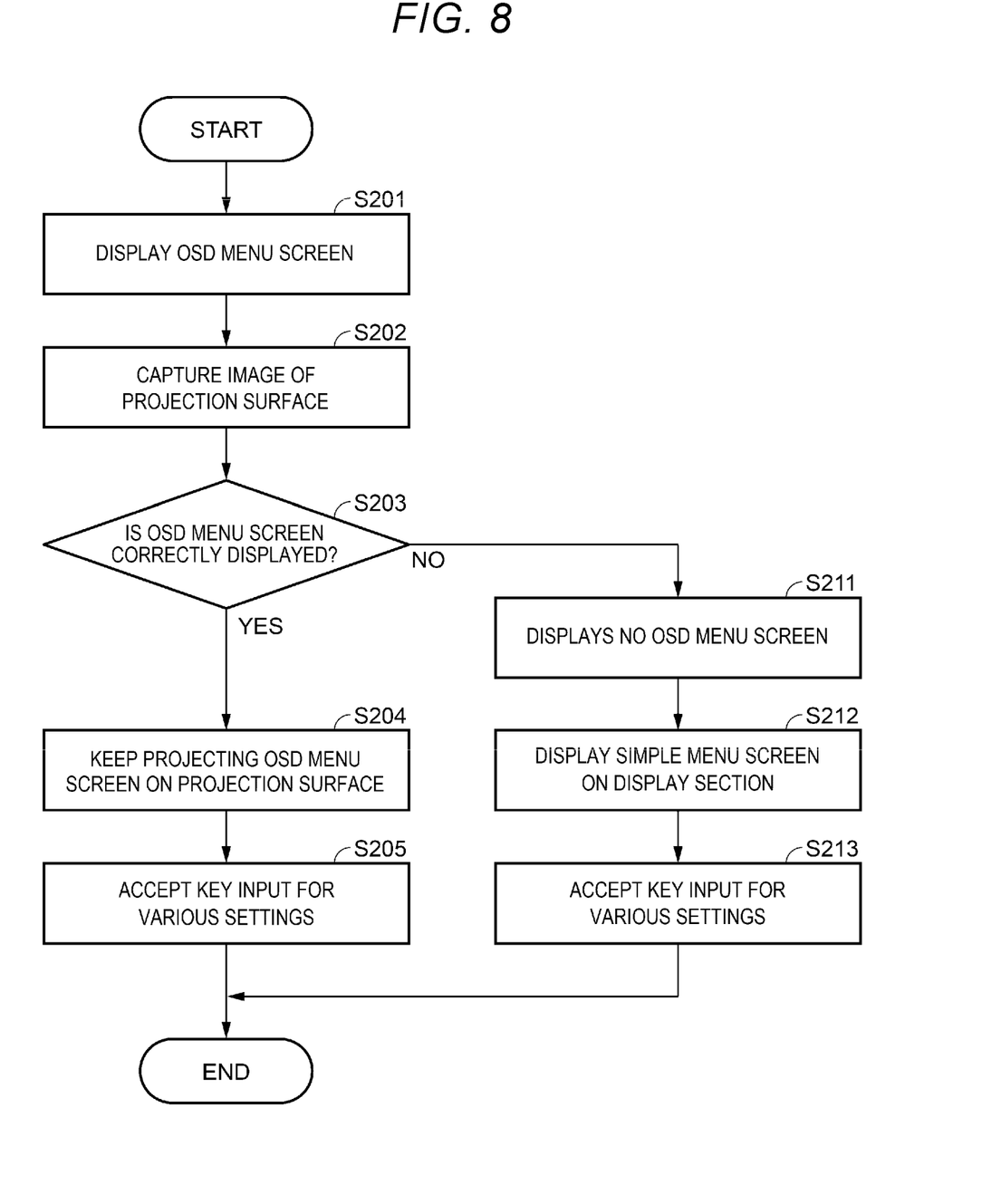
FIG. 8 is a flowchart showing the action of the projector.

FIG. 8 is a flowchart showing the action of the projector according to the second embodiment. The action of the projector 1 (method for controlling projector 1) according to the second embodiment will be described below with reference to FIG. 8. When the user operates the menu key 14 on the operation panel 7, the projector 1 acts in accordance with the procedure shown in FIG. 8.

In step S201, the controller 21 instructs the image information processor 28 to project the OSD menu screen 41 from the image projection section 23, as shown in FIG. 8. In step S202, the controller 21 instructs the imaging section 8 to capture an image of the OSD menu screen 41 projected on the projection surface 50.

In step S203, the controller 21 causes the determiner 21a to determine whether or not the state of the projection surface 50 allows the user to appropriately visually recognize the OSD menu screen 41. In a case where the determiner 21a determines that the user can appropriately visually recognize the OSD menu screen 41, the controller 21 proceeds to the process in step S204 and keeps projecting the OSD menu screen. In a case where the determiner 21a determines that the user cannot appropriately visually recognize the OSD menu screen 41, the controller 21 proceeds to the process in step S211.

In step S205, a key input is accepted for the variety of settings of the projector 1. Specifically, when the user operates any of the keys on the operation panel 7 while viewing the projected OSD menu screen 41, the operation panel 7 outputs an operation signal according to the content of the user's operation to the controller 21. The controller 21 carries out a setting process according to the operation signal and terminates the procedure. The content of the projected OSD menu screen 41 is the same as the content in the first embodiment described above.

In a case where the determiner 21a determines that the state of the projection surface 50 does not allow appropriate visual recognition of the OSD menu screen 41 and the controller 21 proceeds to the process in step S211, the controller 21 instructs the image information processor 28 to stop superimposing the OSD menu screen 41 on the projected image. In step S212, the controller 21 displays the simple menu screen 42 on the display section 6 on the side surface 2s of the projector, as shown in FIG. 6. Specifically, the controller 21 reads image information on the simple menu screen 42 from storage 22. Further, the controller 21 instructs the display section 6 to display the simple menu screen 42.

In step S213, a key input from the operation panel 7 is accepted for the variety of settings of the projector 1. Specifically, when the user operates any of the keys on the operation panel 7 while viewing the simple menu screen 42 displayed on the display section 6, the operation panel 7 outputs an operation signal according to the content of the user's operation to the controller 21. The controller 21 carries out a setting process according to the operation signal and terminates the procedure. The content of the displayed simple menu screen 42 is the same as the content in the first embodiment described above.

As described above, the projector 1 and the method for controlling the projector 1 according to the second embodiment can provide the following effect.

(3) According to the second embodiment, the projector 1 causes the imaging section 8 to capture an image of the OSD menu screen 41 projected on the projection surface 50 and allows the user to set the projector 1 via the OSD menu screen 41 displayed on the projection surface 50 when it is determined that the state of the projection surface 50 allows appropriate visual recognition of the OSD menu screen 41, whereas the projector 1 displays the simple menu screen 42 on the display section 6 and allows the user to set the projector 1 when it is determined that the state of the projection surface 50 does not allow appropriate visual recognition of the OSD menu screen 41. For example, when the projection surface 50 has a light-color, smooth surface, the OSD menu screen 41 is displayed on the projection surface 50, whereby the user can set the projector 1 via a large screen. On the other hand, when projection surface 50 is an irregular surface or has a dark color, the simple menu screen 42 is displayed on the display section 6, whereby the user can set the projector 1 without looking at the projection surface 50. Since the projector 1 displays one of the menu screens in an appropriate aspect in accordance with the state of the projection surface 50 as described above, the convenience of the user who sets the projector 1 can be improved.

Variations

The embodiments described above may be changed as follows.

The embodiments described above have been presented in the form of the aspect in which the lens cover driver 33 is driven to open and close the lens cover 5, but not necessarily, and an aspect in which the lens cover 5 may be manually opened and closed may be employed. In the case where the lens cover 5 is manually opened and closed, a detector that detects whether the lens cover 5 is open or closed may be provided, and the determiner 21a may determine whether or not the lens cover 5 is open based on the result of the detection performed by the detector. Instead, it is not necessary to provide the detector when whether or not the lens cover 5 is open is determined based on an image of the projection surface 50 captured by the imaging section 8.

In the embodiments described above, the selection of one of the menu screens (OSD menu screen 41 and simple menu screen 42) is made based on whether the lens cover 5 is open or closed, as shown in the first embodiment, or based on the state of the displayed OSD menu screen 41, as shown in the second embodiment, but not necessarily, and the first and second embodiments may be combined with each other.

For example, the OSD menu screen 41 is first projected with the lens cover 5 open, and the imaging section 8 and the determiner 21a determine the state of the projection surface 50. In the case where the OSD menu screen 41 is correctly displayed, the user makes the variety of settings of the projector 1 while viewing the OSD menu screen 41. On the other hand, when the OSD menu screen 41 is not correctly displayed, the display section 6 may display the simple menu screen 42, and the user may make the variety of settings of the projector 1 while viewing the simple menu screen 42.

The embodiments described above, in which the OSD menu screen 41 is projected on the projection surface 50 and the simple menu screen 42 is displayed on the display section 6, are not necessarily employed, and the same menu screen may be displayed. Specifically, an enlarged menu screen (OSD menu screen) is displayed on the projection surface 50, and the same menu screen that is not enlarged is displayed on the display section 6. Further, the simple menu screen 42 does not necessarily display three rows, as shown in FIG. 6, and may instead display rows the number of which is fewer than two or rows the number of which is greater than or equal to four.

The processes in the flowcharts shown in FIGS. 4 and 8 start when the menu key 14 on the operation panel 7 is operated, as shown in the embodiments described above, but not necessarily, and the processes in the flowcharts may start, for example, immediately after the projector 1 is activated.

In the embodiments described above, the determiner 21a may detect the contour of a screen as the projection surface 50 based on an image captured by the imaging section 8. In this case, the controller 21 causes the image projection section 23 to project the OSD menu screen 41 when the determiner 21a can detect the contour, and the controller 21 causes the display section 6 to display the simple menu screen 42 when the determiner 21a cannot detect the contour.

In the embodiments described above, the OSD menu screen 41 is projected on the projection surface 50 or the simple menu screen 42 is displayed on the display section 6 in accordance with whether the lens cover 5 is open or closed or the state of the projection surface 50, but not necessarily. For example, the determiner 21a determines whether or not the light source 24 of the projector 1 is turned on, and when the light source 24 is turned on, the controller 21 projects the OSD menu screen 41 on the projection surface 50 and allows the user to make the variety of settings. On the other hand, when the light source 24 is turned off, for example, when the projector 1 is turned off, the projector 1 operates in a power-saving mode, or the projector 1 temporarily stops projecting an image, the controller 21 may cause the display section 6 to display the simple menu screen 42.

In a case where the image projection section 23 has a configuration that allows the projection lens 4 to be interchangeable, a detector that detects whether or not the projection lens 4 is attached may be provided. In this case, the determiner 21a determines whether or not the projection lens 4 is attached based on the result of the detection performed by the detector. The controller 21 then causes the image projection section 23 to project the OSD menu screen 41 when the projection lens 4 is attached, and the controller 21 causes the display section 6 to display the simple menu screen 42 when the projection lens 4 is not attached.

In an aspect in which a plurality of projectors 1 as a whole project a large image, and when the projectors 1 are so disposed that part of an image projected by one of the projectors overlaps with an image projected by another projector 1, the determiner 21a may determine whether or not the width of the overlapping area where the images overlap with each other is smaller than a threshold. In this case, when the width of the overlapping area is smaller than the threshold, the controller 21 causes the image projection section 23 to project the OSD menu screen 41. On the other hand, when the width of the overlapping area is greater than or equal to the threshold, the controller 21 causes the display section 6 to display the simple menu screen 42 because the OSD menu screen 41 could be hidden behind the image projected from the other projector 1.

The determiner 21a may determine whether or not an obstacle is present between the image projection section 23 and the projection surface 50 based on an image captured by the imaging section 8 or the result of detection performed by an obstacle sensor that is not shown. In this case, the controller 21 causes the image projection section 23 to project the OSD menu screen 41 when no obstacle is present. On the other hand, the controller 21 causes the display section 6 to display the simple menu screen 42 when an obstacle is present.

A change in usage of the projector 1 may be monitored, and the state in which the simple menu screen 42 is displayed and the state in which the OSD menu screen 41 is displayed may be switched from one to the other when the usage of the projector 1 is changed.

Contents derived from the embodiments will be described below.

A projector includes a projection section that projects a first setting screen for setting the projector on a projection surface, a display section that is disposed on an enclosure of the projector and displays a second setting screen for setting the projector, a determiner that determines usage of the projector, and a mode switcher that switches an action mode of the projector between a first mode in which the projection section projects the first setting screen and a second mode in which the display section displays the second setting screen in accordance with the usage determined by the determiner.

According to the configuration described above, in which the first mode, in which the first setting screen is projected on the projection surface, and the second mode, in which the second setting screen is displayed on the display section, are switched from one to the other in accordance with the usage of the projector, one of the setting screens can be displayed in an optimum manner in accordance with the usage of the projector. For example, when irregularities of the projection surface cause the projected first setting screen to be hardly visible, the second setting screen can be displayed on the display section to allow the user to, for example, make the variety of settings. On the other hand, in a state in which the first setting screen is viewable, the projection section can project the first setting screen on the projection surface to allow the user to make the variety of settings via the large first setting screen displayed on the projection surface.

The projector described above may include a cover that blocks the projection performed by the projection section. The determiner may determine whether the cover is open or closed, and the mode switcher may switch the action mode to the first mode when the cover is open and switch the action mode to the second mode when the cover is closed.

According to the configuration described above, the first setting screen is projected on the projection surface when the cover is open, and the second setting screen is displayed on the display section when the cover is closed. That is, when the cover is open to allow image projection, the first setting screen is displayed on the projection surface, whereby the user can set the projector via a large screen. On the other hand, when the cover is closed to allow no image projection, the second setting screen is displayed on the display section, whereby the user can set the projector with no image projected from the projector. Since the projector displays one of the setting screens in an appropriate aspect in accordance with whether the cover is open or closed, as described above, the convenience of the user who sets the projector can be improved.

The projector described above may include an imaging section that captures an image of the projection surface. The determiner may determine whether or not the state of the projection surface allows visual recognition of the first setting screen based on then image captured by the imaging section. The mode switcher may switch the action mode to the first mode when the determiner determines that the state of the projection surface allows visual recognition of the first setting screen and switch the action mode to the second mode when the determiner determines that the state of the projection surface does not allow visual recognition of the first setting screen.

According to the configuration described above, the imaging section captures an image of the first setting screen projected on the projection surface. The user sets the projector via the first setting screen displayed on the projection surface when the determiner determines that the state of the projection surface allows appropriate visual recognition of the first setting screen, and the user sets the projector via the second setting screen displayed on the display section when the determiner determines that the state of the projection surface does not allow appropriate visual recognition of the first setting screen. For example, when the projection surface has a light-color, smooth surface, the first setting screen is displayed on the projection surface, whereby the user can set the projector via a large screen. On the other hand, when projection surface is an irregular surface or has a dark color, the second setting screen is displayed on the display section, whereby the user can set the projector without looking at the projection surface. Since the projector displays one of the setting screens in an appropriate aspect in accordance with the state of the projection surface as described above, the convenience of the user who sets the projector can be improved.

In the projector described above, the projection section may include a light source. The determiner may determine whether or not the light source is turned on. The switcher may switch the action mode to the first mode when the light source is turned on and switch the action mode to the second mode when the light source is turned off.

According to the configuration described above, in which whether or not the light source is turned on is determined, and the first mode and the second mode are switched from one to the other in accordance with whether or not the light source is turned on, one of the screens can be displayed in an appropriate aspect, whereby the convenience of the user who sets the projector can be improved.

In the projector described above, the projection section may include an interchangeable projection system, and the determiner may determine whether or not the projection system is attached. The switcher may switch the action mode to the first mode when the projection system is attached and switch the action mode to the second mode when the projection system is not attached.

According to the configuration described above, in which whether or not the projection system is attached is determined, and the first mode and the second mode are switched from one to the other in accordance with whether or not the projection system is attached, one of the screens can be displayed in an appropriate aspect, whereby the convenience of the user who sets the projector can be improved.

A method for controlling a projector including a projection section and a display section disposed on an enclosure of the projector includes determining usage of the projector and switching a first mode in which the projection section projects a first setting screen for setting the projector on a projection surface to a second mode in which the display section displays a second setting screen for setting the projector and vice versa in accordance with the determined usage.

According to the method, in which the first mode, in which the first setting screen is projected on the projection surface, and the second mode, in which the second setting screen is displayed on the display section, are switched from one to the other in accordance with the usage of the projector, one of the setting screens can be displayed in an optimum manner in accordance with the usage of the projector. For example, when irregularities of the projection surface cause the projected first setting screen to be hardly visible, the second setting screen can be displayed on the display section to allow the user to, for example, make the variety of settings. On the other hand, in the state in which the first setting screen is viewable, the projection section can project the first setting screen on the projection surface to allow the user to make the variety of settings via the large first setting screen displayed on the projection surface.

In the projector controlling method described above, a cover that blocks the projection may be disposed in the projector, and whether the cover is open or closed may be determined. The action mode may be switched to the first mode when the cover is open, and the action mode may be switched to the second mode when the cover is closed.

According to the method described above, the first setting screen is projected on the projection surface when the cover is open, and the second setting screen is displayed on the display section when the cover is closed. That is, when the cover is open to allow image projection, the first setting screen is displayed on the projection surface, whereby the user can set the projector via a large screen. On the other hand, when the cover is closed to allow no image projection, the second setting screen is displayed on the display section, whereby the user can set the projector with no image projected from the projector. Since the projector displays one of the setting screens in an appropriate aspect in accordance with whether the cover is open or closed, as described above, the convenience of the user who sets the projector can be improved.

The projector controlling method described above may further include capturing an image of the projection surface, determining whether or not the state of the projection surface allows visual recognition of the first setting screen, switching the action mode to the first mode when it is determined that the state of the projection surface allows visual recognition of the first setting screen, and switching the action mode to the second mode when it is determined that the state of the projection surface does not allow visual recognition of the first setting screen.

According to the method described above, the imaging section captures an image of the first setting screen projected on the projection surface. The user sets the projector via the first setting screen displayed on the projection surface when it is determined that the state of the projection surface allows appropriate visual recognition of the first setting screen, and the user sets the projector via the second setting screen displayed on the display section when it is determined that the state of the projection surface does not allow appropriate visual recognition of the first setting screen. For example, when the projection surface has a light-color, smooth surface, the first setting screen is displayed on the projection surface, whereby the user can set the projector via a large screen. On the other hand, when projection surface is an irregular surface or has a dark color, the second setting screen is displayed on the display section, whereby the user can set the projector without looking at the projection surface. Since the projector displays one of the setting screens in an appropriate aspect in accordance with the state of the projection surface as described above, the convenience of the user who sets the projector can be improved.

What is claimed is:

1. A projector comprising:
   a projection section that projects, on a projection surface, a first setting screen for setting the projector;
   a display section that is disposed at an enclosure of the projector and displays a second setting screen for setting the projector;
   a determiner that determines usage of the projector, the usage of the projector being conditions under which the projector is used;
   a mode switcher that switches an action mode of the projector between a first mode in which the projection section projects the first setting screen and a second mode in which the display section displays the second setting screen in accordance with the usage determined by the determiner; and
   an imaging section that captures an image of the projection surface, wherein the determiner determines whether or not a state of the projection surface allows visual recognition of the first setting screen based on the image captured by the imaging section; and the mode switcher switches the action mode to the first mode when the determiner determines that the state of the projection surface allows visual recognition of the first setting screen and switches the action mode to the second mode when the determiner determines that the state of the projection surface does not allow visual recognition of the first setting screen.

2. The projector according to claim 1, further comprising a cover that blocks the projection performed by the projection section, wherein the determiner determines whether the cover is open or closed, and the mode switcher switches the action mode to the first mode when the cover is open and switches the action mode to the second mode when the cover is closed.

3. The projector according to claim 1, wherein the projection section includes an interchangeable projection system, the determiner determines whether or not the projection system is attached, and the switcher switches the action mode to the first mode when the projection system is attached and switches the action mode to the second mode when the projection system is not attached.

4. A projector comprising:

a projection section that projects, on a projection surface, a first setting screen for setting the projector;

a display section that is disposed at an enclosure of the projector and displays a second setting screen for setting the projector;

a determiner that determines usage of the projector, the usage of the projector being conditions under which the projector is used; and a mode switcher that switches an action mode of the projector between a first mode in which the projection section projects the first setting screen and a second mode in which the display section displays the second setting screen in accordance with the usage determined by the determiner, wherein the projection section includes a light source, the determiner determines whether or not the light source is turned on, and the switcher switches the action mode to the first mode when the light source is turned on and switches the action mode to the second mode when the light source is turned off.

5. A method for controlling a projector including a light source, a projection section and a display section disposed at an enclosure of the projector, the method comprising:

determining usage of the projector, the usage of the projector being conditions under which the projector is used;

switching a first mode in which the projection section projects, on a projection surface, a first setting screen for setting the projector to a second mode in which the display section displays a second setting screen for setting the projector and vice versa in accordance with the determined usage;

determining whether or not the light source is turned on, and switching an action mode of the projector to the first mode when the light source is turned on and switching the action mode to the second mode when the light source is turned off.

6. The method for controlling a projector according to claim 5, wherein a cover that blocks projection is disposed in the projector, whether the cover is open or closed is determined, an action mode of the projector is switched to the first mode when the cover is open, and the action mode is switched to the second mode when the cover is closed.

7. The method for controlling a projector according to claim 5, further comprising:

capturing an image of the projection surface;

determining whether or not a state of the projection surface allows visual recognition of the first setting screen;

switching an action mode of the projector to the first mode when it is determined that the state of the projection surface allows visual recognition of the first setting screen; and switching the action mode to the second mode when it is determined that the state of the projection surface does not allow visual recognition of the first setting screen.

* * * * *